(12) United States Patent
Biecker et al.

(10) Patent No.: US 6,672,657 B2
(45) Date of Patent: Jan. 6, 2004

(54) WIND DEFLECTOR FOR A MOTOR VEHICLE

(75) Inventors: Peter Biecker, Oberhaching (DE); Marco Lauterbach, Kasendorf (DE); Gerhard Schwarz, Planegg (DE); Fritz Wegener, Gilching (DE); Burkhard Reinsch, Kaufbeuren (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/066,787

(22) Filed: Feb. 6, 2002

(65) Prior Publication Data

US 2002/0175539 A1 Nov. 28, 2002

(30) Foreign Application Priority Data

Feb. 6, 2001 (DE) .......................................... 101 05 598

(51) Int. Cl.$^7$ ............................... B60J 7/22; B60J 7/185
(52) U.S. Cl. ....................................... 296/217; 296/121
(58) Field of Search ............................. 296/217, 120.1, 296/121

(56) References Cited

U.S. PATENT DOCUMENTS 5,558,388 A  9/1996  Fürst et al.

FOREIGN PATENT DOCUMENTS

| DE | 3922874 | * | 1/1991 | ................. 296/217 |
| DE | 43 29 580 C1 | | 11/1994 | |
| EP | 0196684 | * | 10/1986 | ................. 296/217 |

* cited by examiner

*Primary Examiner*—Dennis H. Pedder
(74) *Attorney, Agent, or Firm*—Nixon Peabody LLP; David S. Safran

(57) ABSTRACT

A wind deflector (5) for a motor vehicle with roof or a convertible top which can be transferred to a stowage space. The wind deflector (5) is pivotally supported on a cross beam (4) which extends over the front windshield (3), and it can be pivoted by a drive (13) which also actuates a detachable interlock of the convertible top (2) on the cross beam (4), depending on the position of the raising mechanism (18) which is actuated by the drive means (13) for the wind deflector (5), a locking device (11) is coupled to the drive (13) or is uncoupled from it.

23 Claims, 10 Drawing Sheets

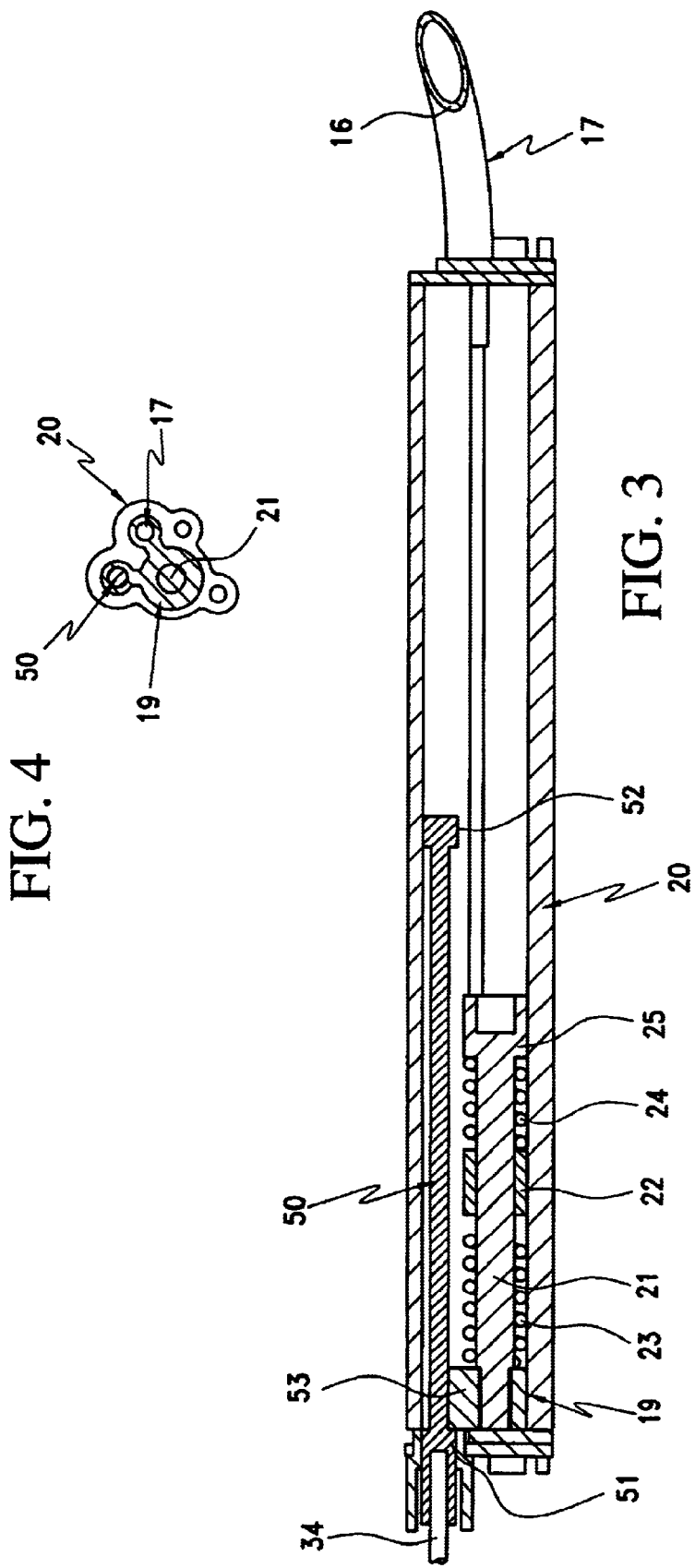

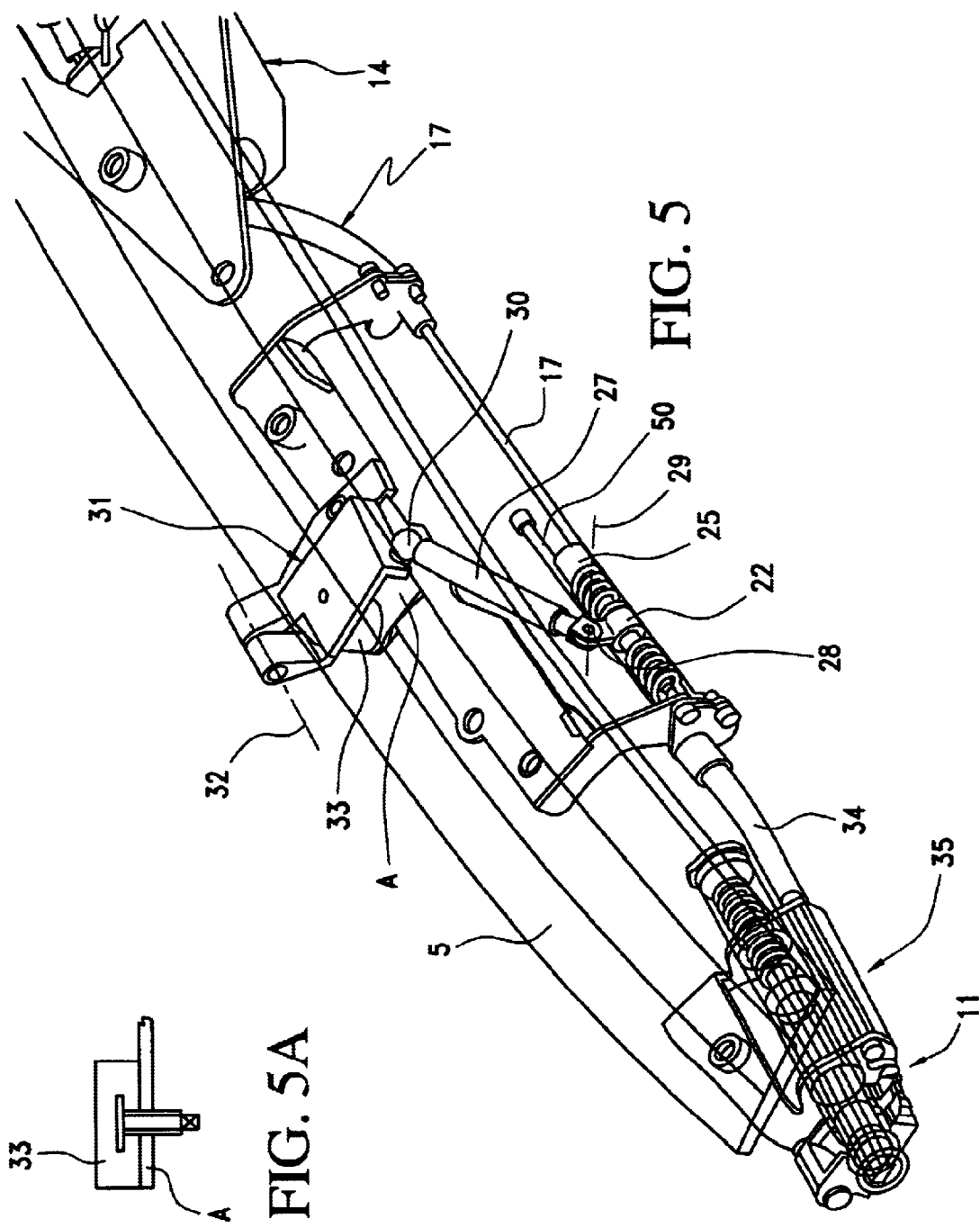

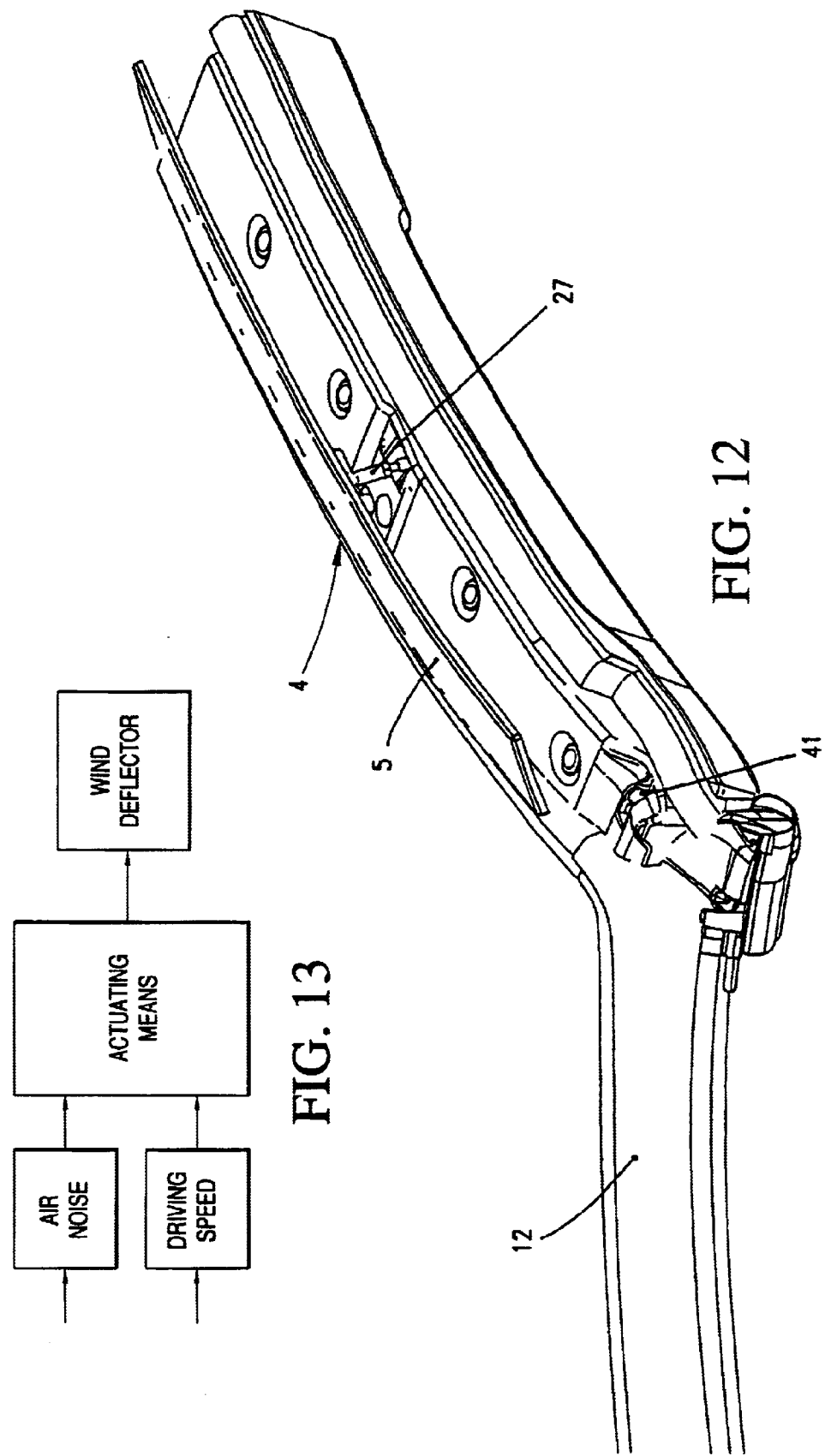

WIND DEFLECTOR FOR A MOTOR VEHICLE

BACKGROUND OF THE INVENTION

1. Field of the Invention

The invention relates to a wind deflector for a motor vehicle with a convertible top which can be transferred to a stowage space, the wind deflector being pivotally supported on a cross beam which extends over the front windshield, and it can be pivoted by a drive means on the cross beam of the windshield which also actuates a detachable interlock of the convertible top.

2. Description of Related Art

U.S. Pat. No. 5,558,388 discloses a convertible motor vehicle roof which can be stored in a storage space, and which is provided with a raisable wind deflector. To raise the wind deflector, an electric drive is provided in the front cross beam above the windshield with which different positions of the wind deflector can be set. In addition, unlocking of the lateral roof parts from the front cross beam can also be produced with the drive when the motor vehicle roof is being opened and lowered.

SUMMARY OF THE INVENTION

A primary object of the invention is to devise a wind deflector of the aforementioned type which has a drive with a simple and reliable structure.

This object is achieved in the aforementioned wind deflector in accordance with the invention in that, depending on the position of the raising mechanism which is actuated by the drive means, the locking means for the wind deflector is coupled to the drive means or is decoupled from it.

In this way, actuation of the locking means, actuation with a simple structure, is made available, since the actuation of the locking means is derived from the motion or the position of the raising mechanism. Thus the locking means does not require its own drive connection or drive means. Preferably the drive means contains a raising mechanism with a movable carriage and a raising lever which couples the carriage to the wind deflector and, depending on the carriage position, adjusts the swivelling position of the wind deflector. The carriage can be guided linearly or also on a curved path.

Furthermore, in a wind deflector for a motor vehicle which is pivotally supported on a cross beam which extends above the front window and can be raised by a drive means, the aforementioned object is also achieved in that the drive means has a raising mechanism with a movable carriage and a raising lever which couples the carriage to the wind deflector and adjusts the pivot position of the wind deflector depending on the carriage position. On its guide, the carriage can also accommodate large reaction forces which are applied via the raised wind deflector. To move or fix the carriage, only a comparatively small force is necessary. Feasibly, the drive means on the cross beam also actuates the detachable locking means of a convertible top which can be transferred into a stowage space. Thus, only one drive means for the wind deflector and also for locking the convertible top, especially of side roof members of a rigid component convertible top, is necessary.

When the carriage is movably guided essentially parallel to the pivot axis of the wind deflector, there is uniform symmetrical motion of the raising lever. Feasibly, the support of the raising lever on the wind deflector and/or on the carriage is formed in the manner of a socket joint which enables wear-free coupling for different positions of the raising lever.

Preferably, the adjustment means for the wind deflector is made such that, in the first end position and in the second end position of the raising mechanism which can be moved by the drive means and in which the wind deflector is closed, the locking means is closed or opened, and that intermediate positions of the raising mechanism set different positions of the wind deflector.

Instead of a permanent connection, the carriage can also be coupled, if necessary, via a coupling means to a transmission means, especially a lock cable, which actuates the locking means.

Feasibly, the carriage can be coupled via a connectible driver depending on the position to the lock cable.

In one embodiment in which the locking means has a movable twist-lock which can be coupled via the lock cable and the driver to the carriage, the carriage can be designed not only to unlock the twist-lock, but it can also push the twist-lock into its closed position. Then preferably the lock cable in its two directions of motion can be coupled via the driver to the carriage.

Alternatively or in addition, the twist-lock of the locking means can be pre-tensioned by a closing spring in the closing direction.

One preferred embodiment calls for the raising lever to be movably supported on the raising mechanism or on the carriage and to be pre-tensioned via a spring means in the closing direction of the wind deflector. The spring means ensures that there is no rigid coupling when the wind deflector is being closed, but spring-elastic compensation is possible. By means of two springs, in both end positions of the carriage, this respective spring-elastic compensation can be made available.

One embodiment of the wind deflector is explained in detail below with reference to the accompanying drawings.

BRIEF DESCRIPTION OF THE DRAWINGS

FIG. 3 is an enlarged lengthwise sectional view of part of the raising mechanism of the wind deflector;

FIG. 4 is a cross-sectional view of the raising mechanism shown in FIG. 3 in the closed and locking position;

FIG. 5 is a perspective view of the drive means shown in FIG. 2 with partially omitted housing parts, and FIG. 5A showing a cross section of the lock of FIG. 5;

FIG. 12 is a perspective plan view of the arrangement of the wind deflector on the windshield apron of the motor vehicle; and FIG. 13 is a block diagram of the controlling of the actuating means responsive to control parameters.

DETAILED DESCRIPTION OF THE INVENTION

Figure 1:
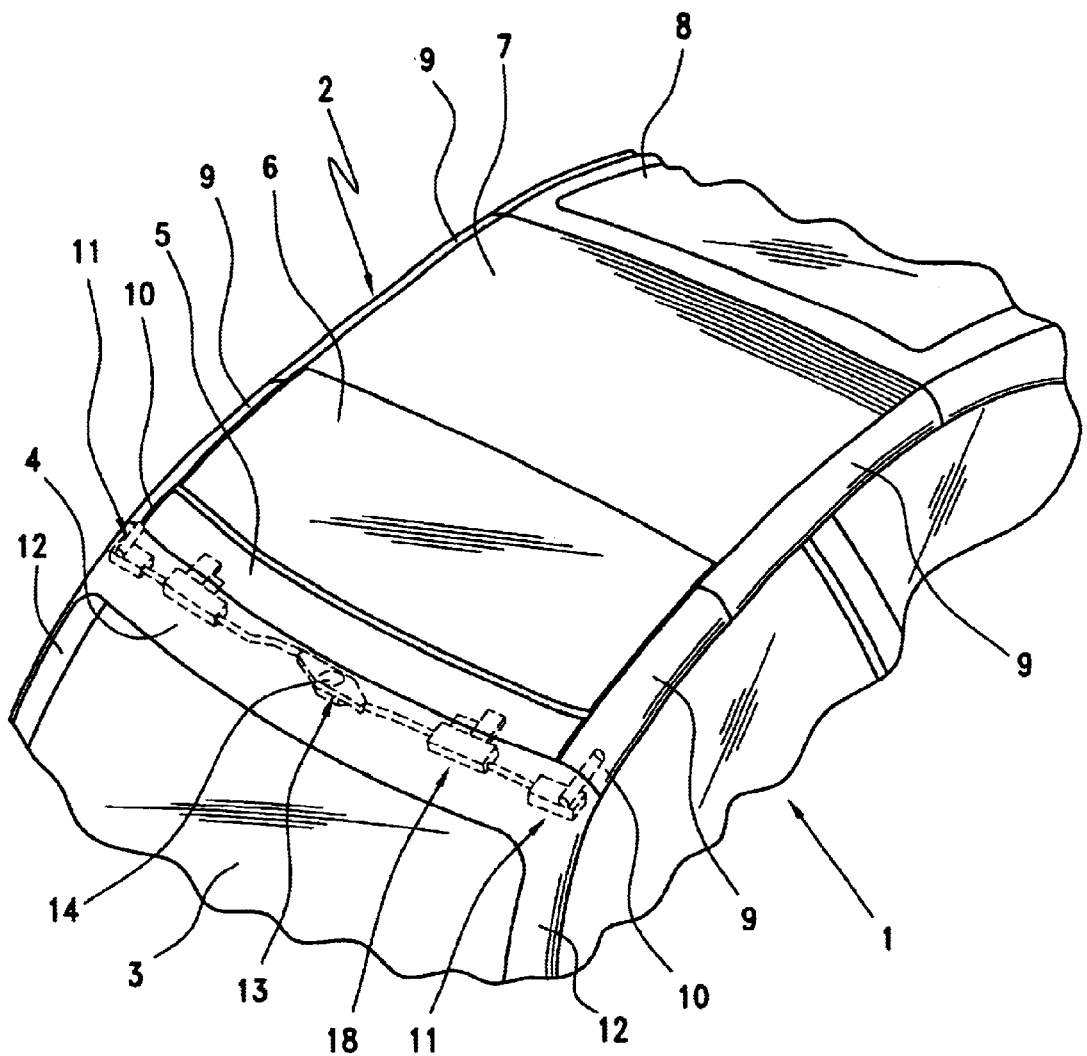
FIG. 1 is a perspective overhead view a convertible motor vehicle roof with a wind deflector in the closed position.

A passenger vehicle 1 with a convertible top or vehicle roof 2 which can be can be lowered into a rear convertible top compartment contains a front window 3 and a cross beam 4 or apron which extends crosswise above the front window 3 and on which the wind deflector 5 is pivotally supported in the manner of a louver which can be swung up. The motor vehicle roof 2 has a front cover 6 which is formed, for example, as an externally-guided sliding and lifting roof cover, a rear roof element 7, a rear window element 8 and lateral roof members 9 on which the front cover 6 and the rear roof element 7 are movably guided. The lateral roof members 9 can be locked at their front end 10 on the front cross beam 4 or on the lateral A-columns 12 via respective locking means 11.

On the front cross beam 4, there is a drive means 13 for the wind deflector 5 which, for actuating the respective locking means 11, both of the right and also the left side roof member 9, is also connected to them. To open and stow the motor vehicle roof 2, the front cover 6 and the rear roof element 7 are moved to the rear onto the rear window element 8. Then, after unlocking the respective locking means 11, the lateral roof member 9, which can be divided in the lengthwise direction into several roof member parts as shown in FIG. 1, is moved to the rear via its own drive (not shown) and is deposited with the rear element 8 in the storage space or convertible top compartment. The motor vehicle roof 2 then has a structure, for example, according to the motor vehicle roof described in U.S. Pat. No. 5,558,388 and lowering takes place in a comparable manner.

The following description addresses the left half of the wind deflector or motor vehicle roof which is built largely symmetrically to the lengthwise center plane of the motor vehicle, but the description applies to the right half as well.

Figure 2:
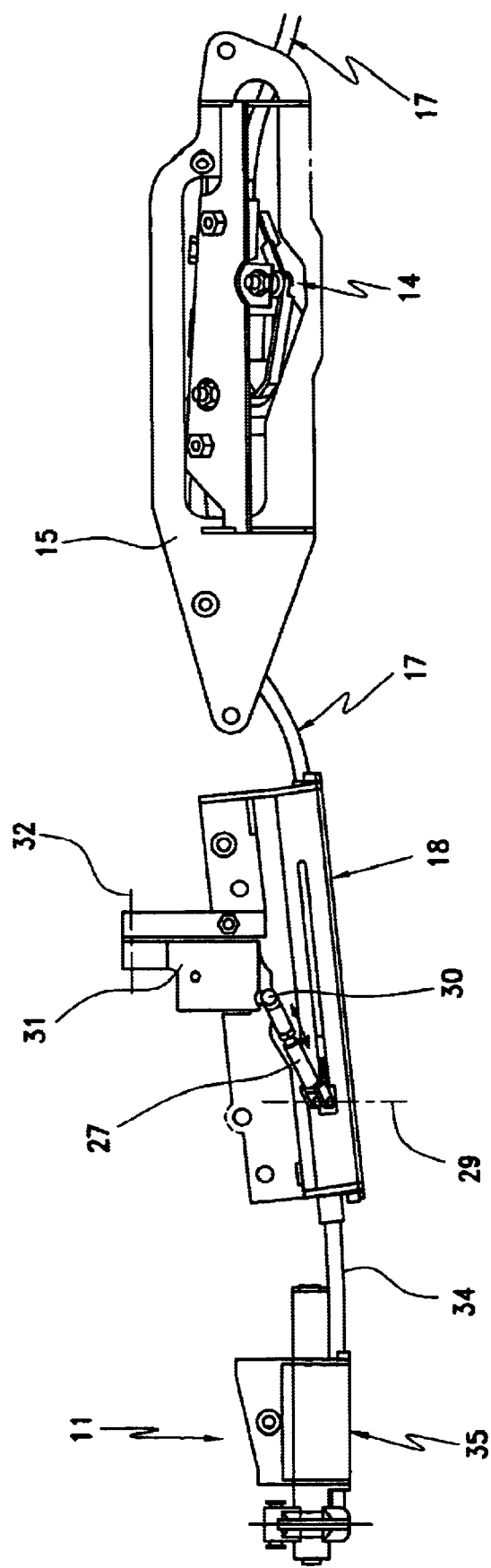
FIG. 2 is a plan view of a drive means of the wind deflector with a locking means for a lateral roof member.

The drive means 13 contains an electric drive motor 14 which is attached roughly in the middle of the cross beam 4 by means of a holder 15 (see FIG. 2). The drive motor 14 by means of step-down gearing drives each drive cable 17 which is guided in a jacket 16. The drive cables 17 is formed, for example, as a Bowden cable, and is coupled to the raising mechanism 18 of the wind deflector 5. The raising mechanism 18 contains a carriage 19 (see, FIGS. 3 & 4) which is movably supported on a bearing profile rail 20 and is connected to the drive cable 17. A bearing rod 21 is permanently connected to the carriage 19, and a bearing sleeve 22 is movable located on the rod 21 between two helical springs 23, 24 which engage against the carriage 19 or the opposing end collar 25 of the bearing rod 21. On the bearing sleeve 22, a raising lever 27 (see, FIGS. 2 & 5) is hinged for movement around a pivot axis 29 of a joint 28 and is connected on its other end by means of a socket joint 30 to a hinge part 31 which is mounted on the cross beam 4 to be able to pivot around a pivot axis 32 which runs crosswise of the roof and to which the wind deflector 5 is attached. The raising lever 27 is formed in two parts such that its two ends can be twisted relative to one another around its lengthwise axis.

The carriage 19 is in a position away from the drive motor 14 (see, FIGS. 2, 3, and 5) in the closed position in which the joint 28 with the carriage 19 has the greatest distance from the vertical lengthwise plane through the hinge part 31. The raising lever 27 has pulled the hinge part 31 down into the closed position against a rubber buffer 33 (FIG. 5) as an end stop. Thus, the wind deflector 5 is in its closed position which is flush on the motor vehicle roof 2.

Figure 6:
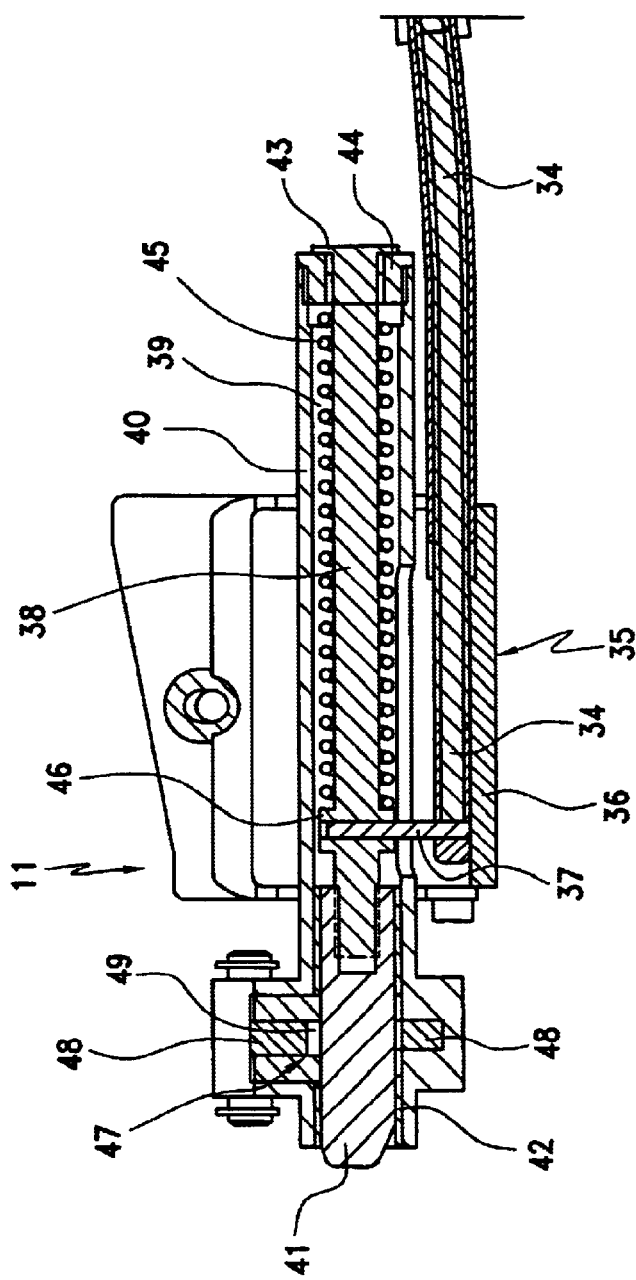
FIG. 6 is an enlarged lengthwise sectional view of the lock of the locking means for the lateral roof member.
Figure 7:
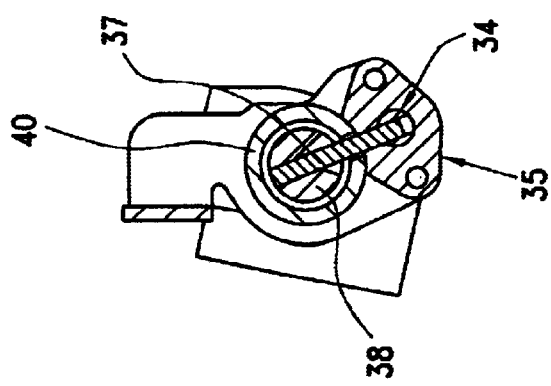
FIG. 7 is a cross-sectional view of the lock of the locking means shown in FIG. 6.

From the raising mechanism 18, a lock cable 34 leads to a lock 35 of the locking means 11 which lies laterally on the outside. The end of the lock cable 34 is guided in a bar 36 of the lock 35 (see, FIG. 6) and is permanently connected by means of a connecting pin 37 to a cylindrical lock pin 38. The lock pin 38 is movably held in a cylindrical hole 39 of the vehicle-mounted lock housing 40. The front end of the lock pin 38 is connected via a screw thread to a twist-lock 41 which is movably held in the bearing sleeve 42 which has been inserted in the hole 39. The back end of the lock pin 38 is movably held in a bearing sleeve 43 which is held in a hole of the housing cover 44 which is screwed in the hole 39 of the lock housing 40. A helical or lock spring 45 surrounds the lock pin 38 and is supported on the front side on a collar 46 of the lock pin 38 and on the back side on the housing cover 44. The helical spring 45 pretensions the lock pin 38 in the closing direction (to the left in FIG. 6).

The lock housing 40 and the bearing sleeve 42 have a lateral opening 47 in the area of the twist-lock 41 towards the hole 39 in which the retaining clip 48 of the side roof member 9 is positioned in its closed state such that (see, FIG. 6) the twist-lock 41 can be pushed through an opening 49 which is aligned coaxially relative to the twist-lock 41 and is formed in the retaining clip 48, and thus, can keep the retaining clip 48 locked on the locking means 11 and the lock 35.

The drive-side end of the lock cable 34 (see, FIG. 3) is permanently connected to an elongated driver 50 which is movably supported in the bearing profile rail 20 of the raising mechanism 18 parallel to the carriage 19 and has a locking stop 51 on its end facing the lock 35 and an unlocking stop 52 on its opposite end facing the raising mechanism 18. Depending on the direction of motion of the carriage 19, a carriage driver part 53 can be caused to engage the locking stop 51 or the unlocking stop 52 and push the driver 50 and thus the lock pin 38.

In the closed position of the motor vehicle roof 2 in which the lateral roof members 9 are coupled to the cross beam 4 and are kept interlocked with the locking means thereto (see, FIG. 1) and the front cover 5 can be closed or even partially or completely opened, the carriage 19 is located on the lock-side end of the bearing profile rail 20 (FIG. 3) and the raising lever 27 has pulled the hinge part 31 down into its closed position (FIGS. 2 & 5) so that the wind deflector 5 is flush against the motor vehicle roof 2. At the same time, the driver 50 of the lock cable 34 is in its front end position, and thus, also the lock pin 38 which keeps the twist-lock 41 in the opening 49 of the retaining clip 48 of the side member 9.

Figure 8:
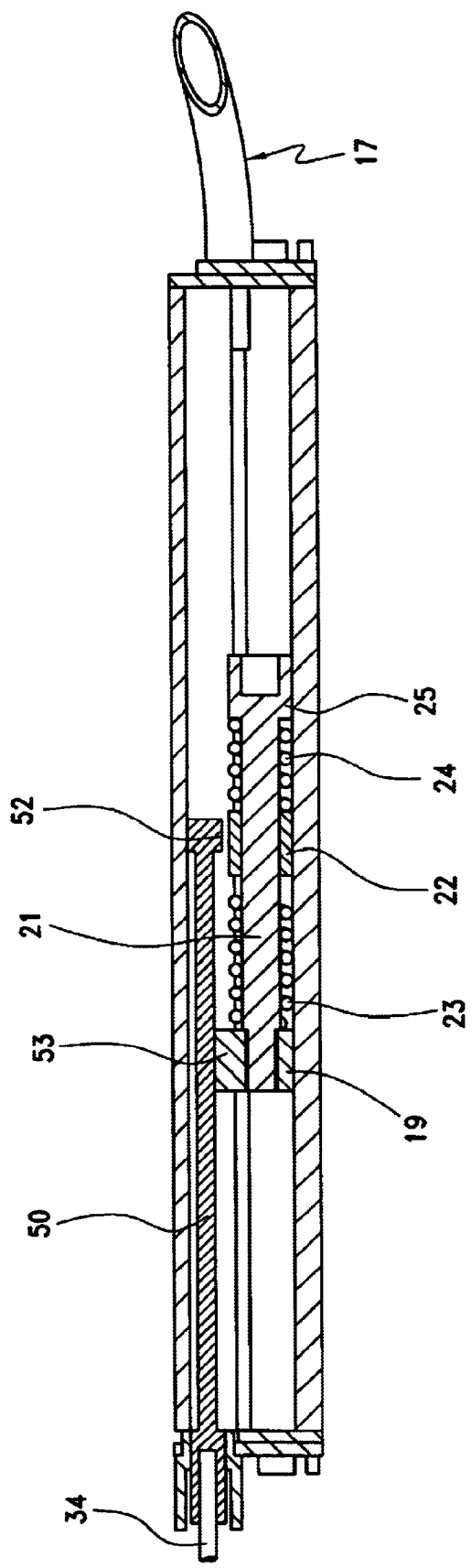
FIG. 8 is an enlarged lengthwise sectional view of the part of the raising mechanism of the wind deflector shown in FIG. 3 in an intermediate position with the wind deflector raised.
Figure 9:
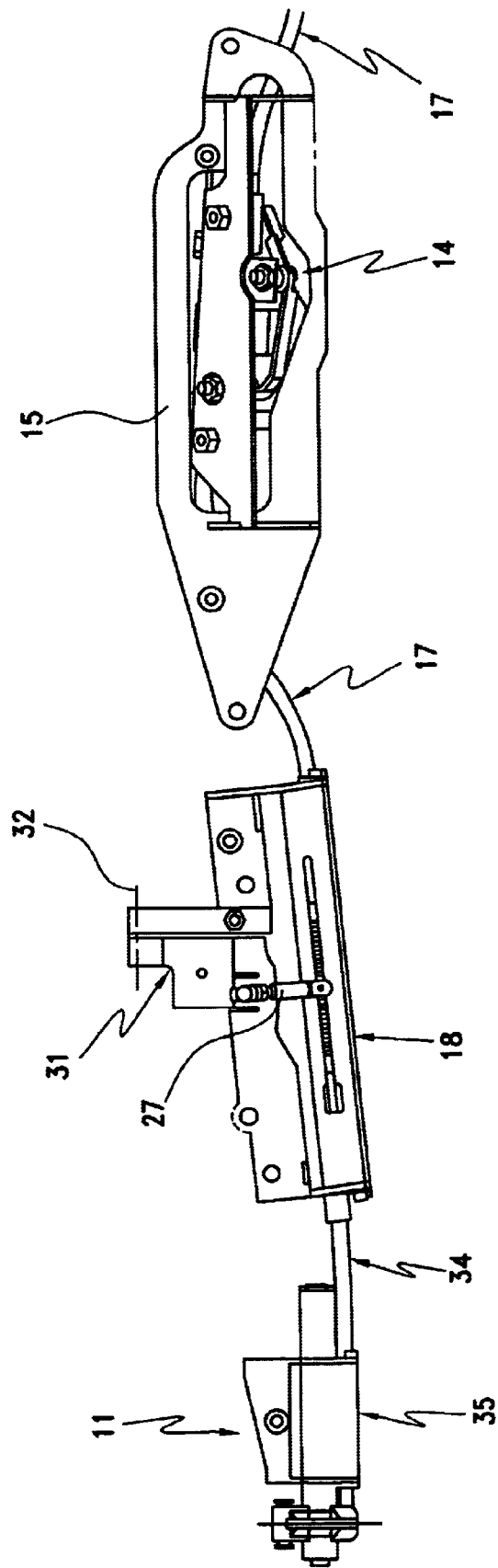
FIG. 9 is a plan view of the drive means of the wind deflector as shown in FIG. 2 with the locking means in the intermediate position with the wind deflector raised.

To open and lower the motor vehicle roof 2, the drive motor 14 is actuated and moves the carriage 19 on the bearing profile rail 20 in the direction to the drive motor 14 by means of the drive cable 17 (motion between FIGS. 3 & 8). In doing so, the raising lever 27 pivots the hinge part 31 upward so that the wind deflector 5 is raised (FIG. 9). The carriage 19, which has been moved farther via its carriage-driver part 53, engages the unlocking stop 52 of the driver 50, and on the way into its end position (see, FIG. 10), via the driver 50 and the lock cable 34, pulls the lock pin 38 and the twist-lock 41 out of their closed position into their open position in which the twist-lock 41 is disengaged from the opening 49 of the retaining clip 48 of the side member 9. Thus, the side member 9 can be moved to the rear away from the cross member 4 via its lowering drive.

In the end position of the carriage 19 (FIGS. 10 & 11), the raising lever 27, which has continued to move, has been moved out of its maximally raised position into its second closed position in which it has again pivot the hinge part 31 down so that the wind deflector 5 is closed again.

To raise the wind deflector 5 with the motor vehicle roof 5 lowered, by means of the drive motor 14, the carriage 10 is moved between its end position facing the drive 13 (see, FIG. 11) and its middle position in which the raising lever 27 has pivoted the hinge part 31 to the maximum degree (FIG. 9). Via an actuation means, any pivot positions of the wind deflector 5 can be set. Adjustment can take place, for example, automatically based on a noise measurement or depending on the driving speed.

Figure 10:
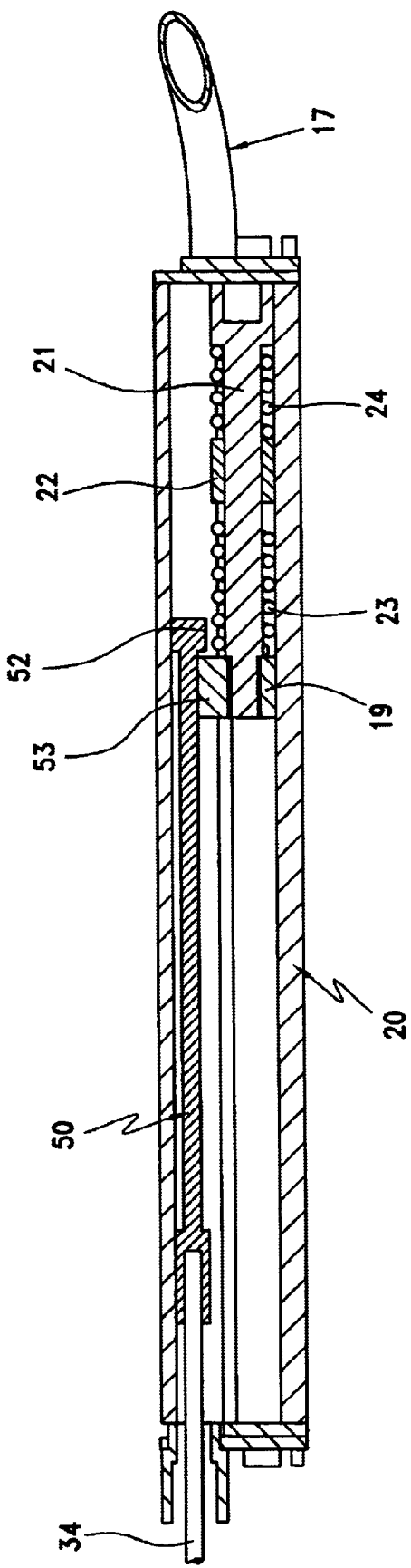
FIG. 10 is an enlarged lengthwise sectional view of the part of the raising mechanism of the wind deflector shown in FIG. 8 in the end position with the lock unlocked and with the wind deflector swung down.
Figure 11:
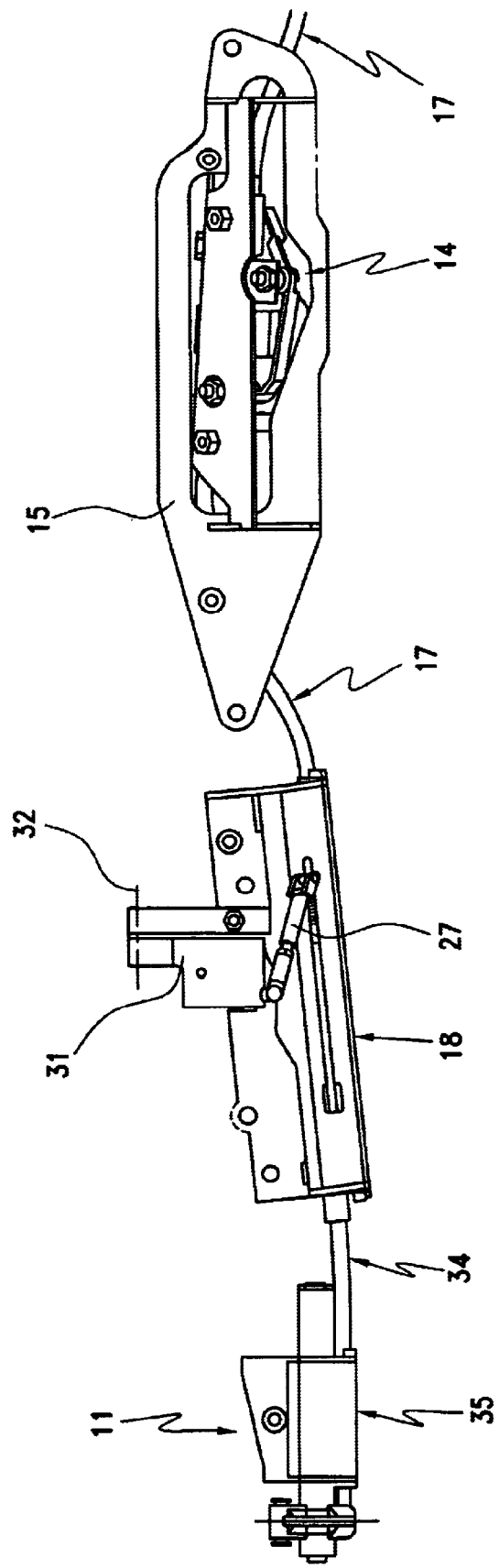
FIG. 11 is a plan view the drive means of the wind deflector as shown in FIG. 9 with the locking means in the end position with the lock unlocked and with the wind deflector swung down.

Before coupling the lateral roof members 9 to the cross beam 4, the drive motor 14 moves the carriage 19 into its end position facing away from the lock 35 (closed position of the wind deflector 5; FIG. 10) in which the lock pin 38 is withdrawn, and thus, the lock 35 is opened. The front end 10 of the roof member 9 is moved into position on the cross beam 4 and coupled such that the opening 49 is flush with the twist-lock 41. The drive motor 14 moves the carriage 19 against the lock 35, accompanied by the described swinging-in and -out motion of the wind deflector 5, the moving carriage 19 imparting to the driver 50 a displacement motion which is caused by the return force of the lock spring 45. If the spring force of the lock spring 45 should not be enough to move the lock pin 38 and the driver 50 into their closed position, the front carriage-driver part 53 of the carriage 19 engages the locking stop 51 of the driver 50 and presses it into its closed position.

With the side member 9 coupled and the lock 35 locked, the pivot position of the wind deflector 5 is set on the first half of the displacement motion of the carriage 19, in which the drive 50 for the lock 35 is not actuated.

The rubber buffer 33 is, for example, supported to be vertically adjustable via a screw on a holder or the cross beam 4 so that the wind deflector 5 in its lowered closed position can be adjusted to be exactly flush with the outside skin of the motor vehicle roof. The length of the raising lever 27 is adjustable, for example, via two parts of the raising lever 27 which can be screwed against one another.

In the two opposing end positions of the carriage 19 of the raising means 18 (see, FIGS. 3 & 6), the pre-tensioned spring 23, 24 which is on the inside at the time presses on the bearing sleeve 22 in the closing direction of the raising lever 27. This supporting of the bearing sleeve 22 or of the raising lever 27 between the two springs 23, 24 enables equalization of the tolerance, especially between the left-side raising means and the right-side raising means so that the wind deflector 5 always brought into engagement with the rubber buffer 33 by spring force in its closed position.

Instead of the described coupling of the drive cable 17 to the lock cable 34, a coupling means, for example, in the manner of a locking block mechanism can be used, as shown in German patent 43 29 580 C1.

What is claimed is:

1. Arrangement for a motor vehicle with a convertible top which can be transferred to a stowage space, comprising:
   a cross beam which extends over the front windshield;
   a wind deflector pivotally supported on said cross beam;
   a raising mechanism for raising and lowering the wind defector;
   a disengageable lock mechanism for securing at least a portion of the convertible top on the cross beam;
   a drive device connected for actuating the wind deflector raising mechanism and the disengageable lock mechanism;
   wherein the lock mechanism is coupled and uncoupled from the drive device depending on the position of the raising mechanism which is actuated by the drive device.

2. Arrangement as claimed in claim 1, wherein a raising mechanism has a movable carriage and a raising lever which couples the carriage to the wind deflector and which sets the position of the wind deflector depending on the position of the carriage.

3. Motor vehicle wind deflector arrangement comprising a wind deflector which is pivotally supported on and is raisable by a drive device;
   wherein the drive device has a raising mechanism with a movable carriage that is movably supported on a bearing profile rail and has a raising lever which couples the carriage to the wind deflector and sets the position of the wind deflector depending on the position of the carriage; and wherein the drive device also actuates a detachable locking mechanism for a convertible top which is located on a windshield cross beam.

4. Motor vehicle wind deflector arrangement, comprising a wind deflector which is pivotally supported on and is raisable by a drive device;
   wherein the drive device has a raising mechanism with a movable carriage that is movably supported on a bearing profile rail and has a raising lever which couples the carriage to the wind deflector and sets the position of the wind deflector depending on the position of the carriage; wherein one of the raising lever on the carriage and a bearing rod which is connected to the carriage is supported between two compression springs which are supported on one of the carriage and the bearing rod; and wherein, in the closed position of the wind deflector, driving force acts spring-elastically via one of the compression springs on a support of the raising lever.

5. Motor vehicle wind deflector arrangement as claimed in claim 3, wherein the carriage is movably guided essentially parallel to a pivot axis of the wind deflector.

6. Motor vehicle wind deflector arrangement as claimed in claim 3, wherein the raising lever is connected to one of the wind deflector and the carriage by a socket joint.

7. Motor vehicle wind deflector arrangement as claimed in claim 3, wherein the raising mechanism is movable to a first end position and to a second end position by the drive device and in which the wind deflector is in a closed position, and wherein intermediate positions of the raising mechanism set different pivoted-out positions of the wind deflector.

8. Motor vehicle wind deflector arrangement as claimed in claim 3, wherein the carriage is couplable to the locking mechanism by a transmission.

9. Motor vehicle wind deflector arrangement as claimed in claim 8, wherein the transmission is a lock cable; and wherein the carriage is coupled to the locking mechanism via a connectable driver depending on a direction of motion of the lock cable.

10. Motor vehicle wind deflector arrangement as claimed in claim 9, wherein the locking mechanism has a movable twist-lock which is couplable via the lock cable and the driver to the carriage.

11. Motor vehicle wind deflector arrangement as claimed in claim 10, wherein the lock cable is couplable via the driver to the carriage in two directions of motion.

12. Motor vehicle wind deflector arrangement as claimed in claim 10, wherein the twist-lock of the locking mechanism is pre-tensioned by a closing spring in a closing direction.

13. Motor vehicle wind deflector arrangement as claimed in claim 3, wherein the raising lever is movably supported on one of the raising mechanism and the carriage and is pre-tensioned via a spring means in a closing direction of the wind deflector.

14. Motor vehicle wind deflector arrangement as claimed in claim 3, wherein the drive device has a drive motor which is constructed for mounting centrally on the windshield cross beam in an installed state, and wherein the drive motor is coupled on either side via a respective drive cable to a respective raising means for the wind deflector, and wherein said raising means couples the drive motor to a respective said locking mechanism for the convertible top.

15. Motor vehicle wind deflector arrangement as claimed in claim 3, wherein the wind deflector, in a closed position, adjoins an adjustable stop element.

16. Motor vehicle wind deflector arrangement as claimed in claim 3, wherein the adjustable stop element is a rubber buffer.

17. Motor vehicle wind deflector arrangement as claimed in claim 3, wherein the wind deflector is attached to a hinge part which is adapted to be mounted to pivot around an axis extending, in an installed state, in a transverse direction of the vehicle; and wherein the raising lever is coupled to said hinge part.

18. Motor vehicle wind deflector arrangement as claimed in claim 3, wherein the raising lever has a length which is adjustable.

19. Motor vehicle wind deflector arrangement as claimed in claim 3, wherein an actuating means is provided for setting different pivot positions of the wind deflector with the locking means opened and also closed.

20. Motor vehicle wind deflector arrangement as claimed in claim 1, wherein said actuating means is responsive to control parameters for setting said different pivot positions of the wind deflector, the control parameters being one of air noise and driving speed.

21. Motor vehicle wind deflector arrangement as claimed in claim 2, wherein the carriage is movably supported on a bearing profile rail.

22. Motor vehicle wind deflector arrangement as claimed in claim 21, wherein a drive cable and driver are supported on the bearing profile rail.

23. Motor vehicle wind deflector arrangement as claimed in claim 21, wherein a lock cable is supported on the bearing profile rail.

* * * * *